US009501926B1

(12) United States Patent
Meninno et al.

(10) Patent No.: US 9,501,926 B1
(45) Date of Patent: Nov. 22, 2016

(54) TWO WIRE SONAR TELEMETRY

(71) Applicants: Justin T Meninno, Fall River, MA (US); Michael J Obara, North Kingstown, RI (US)

(72) Inventors: Justin T Meninno, Fall River, MA (US); Michael J Obara, North Kingstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/870,069

(22) Filed: Sep. 30, 2015

(51) Int. Cl.
*G08C 19/22* (2006.01)
*H04L 5/16* (2006.01)

(52) U.S. Cl.
CPC ................. *G08C 19/22* (2013.01); *H04L 5/16* (2013.01)

(58) Field of Classification Search
CPC ............................... G01K 13/00; H01B 7/324
See application file for complete search history.

(56) References Cited

U.S. PATENT DOCUMENTS 4,553,247 A * 11/1985 Harris .................... G08C 15/00 178/70 R
2010/0238020 A1* 9/2010 Pellen .................... H01B 7/324 340/533

* cited by examiner

*Primary Examiner* — Ojiako Nwugo
(74) *Attorney, Agent, or Firm* — James M. Kasischke; Jean-Paul A. Nasser; Michael P. Stanley

(57) ABSTRACT

The invention is a two wire telemetry system for an entire towed underwater acoustic sonar array system wherein power and data signals are now shared on a single wire (with a second wire as return) throughout the towed array. Ship electrical power is transmitted from a direct current source onto the tow cable for all of the array nodes to operate on. Downlink commands are also sent to the array nodes via the tow cable. Uplink data is sent up the tow cable to the towing vessel for data storage. A bi-directional time sharing communication protocol allows each node on the array as well as the command and control on the towing vessel a portion of time to transmit signals.

5 Claims, 2 Drawing Sheets

TWO WIRE SONAR TELEMETRY

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to electronic telemetry systems, and more particularly to a sonar telemetry system that combines power and data signals on the same wire in an effort to reduce the number of wires in a towed array system including the tow cable and all of the nodes of the array.

(2) Description of the Prior Art

Underwater towed acoustic sonar array reliability is a concern. Reducing the number of wires in a towed array system improves the array performance and reliability, while also decreasing fabrication and testing time. The concept of reducing the number of wires in an electrical system to improve performance and reliability gained widespread use in the telecommunications industry as exhibited by the of use only two wires for telephone circuitry. What is needed is a sonar telemetry system for an underwater towed acoustic sonar array that incorporates power and data on the same wire while sharing a common return or ground wire, and also incorporates a scheme for bi-directional data flow between all telemetry nodes.

SUMMARY OF THE INVENTION

It is a general purpose and object of the present invention to improve the performance and reliability of an underwater towed acoustic sonar array.

It is also an object to decrease the fabrication and testing time of an underwater towed acoustic sonar array.

These objects are accomplished through the use of a two wire telemetry system that injects ship electrical power from a direct current source onto the tow cable for all of the array nodes to operate on. Downlink commands are also sent to the array nodes via the tow cable. Uplink data is sent up the tow cable to the towing vessel for data storage. A bi-directional communication protocol allows each node on the array as well as the command and control on the towing vessel a portion of time to transmit data back and forth.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
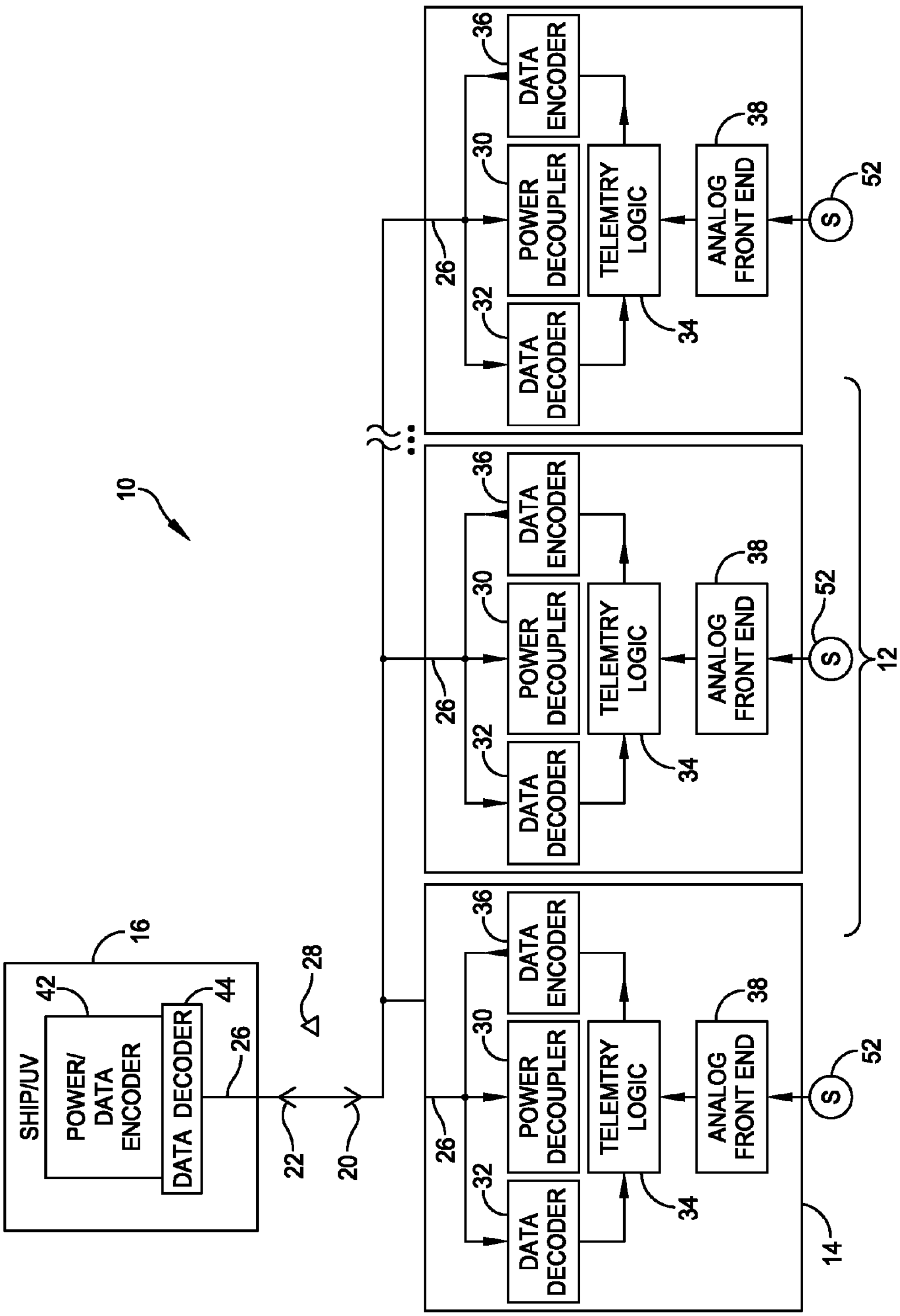
FIG. 1 illustrates the inter-array wiring between the submarine, the tow cables and the array nodes.

Referring to FIG. 1, there is illustrated a system 10 that utilizes two wires to distribute power and communicate bidirectional data throughout an entire towed acoustic sonar array 12 having N nodes 14 for use with a surface or underwater vehicle 16 that is deploying the towed array 12. Power (direct current, voltage range is dependent upon the generator in use) and data (the frequency of the data rate is dependent on the type of array 12 in use) are combined on a first wire 20 at the surface or underwater vehicle. A second wire 22 serves as the ground for the entire system.

In alternate embodiments, the system 10 may comprise forty channels 24, two channels per node, 1 kHz sample rate, sixteen bit sampling (case 1) or five hundred channels, two channels per node, 250 Hz sample rate, twelve bit sampling (case 2). In order to accurately sample and reconstruct the data, the data must be sampled at a rate at least twice the highest frequency component in the data. This rate is commonly referred to as the Nyquist sampling rate. Dividing the sample rate in each configuration case (case 1 and case 2) by two would yield the maximum frequency that could be sampled; however, this assumes perfect signal filtering, which is impossible to achieve in practice. Therefore, to include some of the effects of the sensor, each sample rate is divided by a factor of 2.5 (as design frequency is around 40% of the sample rate), yielding design frequencies of approximately 400 Hz in case 1 and approximately 100 Hz in case 2.

The speed of sound in water is related to the wavelength and the design frequency of each case by the following equation: Speed of sound in water=Wavelength*Frequency. Where the speed of sound in water is approximately 4800 feet per second and the frequency is the design frequency for each case. This equation yields wavelengths of 12 feet for case 1 and 48 feet for case 2. However, to prevent aliasing, the spacing between the sensors is equal to half of the wavelength. This yields a spacing of six feet between the sensors in case 1, and a spacing of twelve feet between the sensors in case 2. Throughput is calculated as: Throughput=(Fs*# bits*# channels)+overhead. Where Fs is the sampling rate, # bits is the number of bits used in the sampling scheme, and the # channels is the number of channels used in the telemetry system. Overhead is the number of bits used for information regarding the data that was sampled. Overhead is neglected in the following calculations: Case 1 throughput=(1 kHz*16 bits*40 channels)=640 kilobits per second (kbps); Case 2 throughput=(250 Hz*12 bits*500 channels)=1.5 megabits per second (Mbps).

The combined power and data signal 26 is transmitted down the tow cable 28 (downlink) to the individual nodes 14 on the towed array 12. Each array node 14 filters the combined power and data signal. Power is recovered as a separate power signal through a low-pass filtering power de-coupler 30. Data is recovered as a separate data signal through a high-pass filtering data decoder 32. This data is then processed by the node telemetry logic 34. Each node 14 has an acoustic sensor 52 joined to the analog front end 38 of the node 14 that provides a data sample. For each node, the data sample is encoded by the node data encoder 36 on to the first wire and transmitted back to the surface or underwater vehicle (uplink). A bi-directional communication protocol facilitates the uplink and downlink transmissions, eliminating bus contention concerns.

Figure 2:
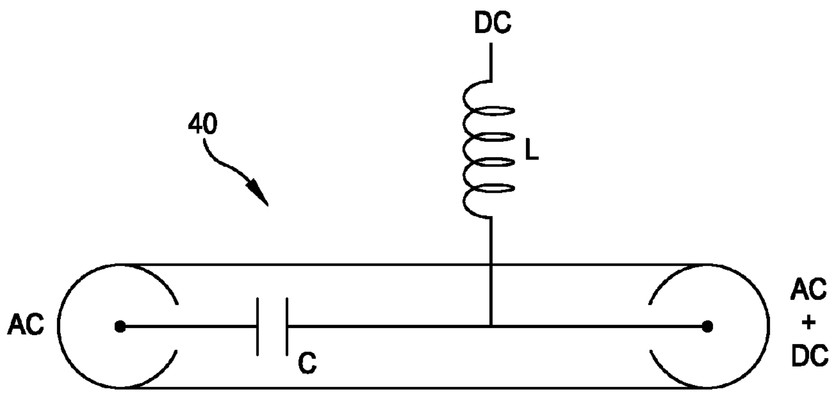
FIG. 2 illustrates an example of a bias tee circuit.

The system is implemented on an inductor-capacitor network called the bias tee circuit consisting of one inductor and one capacitor. An example of a bias tee circuit is illustrated in FIG. 2. The direct current (DC) source is applied to the first lead of an inductor L. A data source, which can be thought of as an alternating current (AC) signal, is applied to the first lead of a capacitor C. A capacitor C is used to block the DC source from entering the path back to the AC source. The inductor L, in turn, prevents the data signal from entering the path back to the DC source. However, where the inductor's and capacitor's terminals meet, the data (AC) signal and DC source are combined together.

When dealing with a conductor which is long in length such as the tow cable, the conductor has parasitic resistances, capacitances, and inductances while shorter conductors would have negligible parasitics. In a preferred embodiment, the resistance of the tow cable is calculated to be 17.03 Ohms.

In a preferred embodiment, the two types of data generated in the system of the present invention are referred to as the uplink and downlink. The uplink is comprised of the acoustic data sampled by the acoustic sensors as well as header information that precedes the acoustic data. The header information includes specifics pertaining to the uplink data being transmitted as well as system status. The downlink is comprised of the commands sent to the telemetry logic, such as gain control commands. The bi-directional communication protocol allots predetermined amounts of time to transmit either the uplink or the downlink.

In the case of downlink, the data is generated in the surface or underwater vehicle 16 by a user and encoded onto the tow cable 28 via a power/data encoder 42. The downlink data is only transmitted down the tow cable during its allotted time frame. Power is also fed into the power/data encoder and placed onto the tow cable. Power will always be present on the tow cable independent of transmission.

In the case of uplink, the acoustic data is sampled and processed by the analog front end 38 and telemetry node logic 34. The processed data is then encoded onto the tow cable 28 via the data encoder 36 and transmitted to the surface or underwater vehicle 16. Each node 14 transmits during its allotted time frame. The surface or underwater vehicle 16 utilizes a data decoder 44 to recover the uplink data from the combined power and data signal 26.

In addition, each node 14 contains a power decoupler 30 that removes any existing data on the line. The power signal is then conditioned to power the node's telemetry logic 34, analog front end 38, and associated circuitry.

The architecture for the telemetry system 10 is a shared bus implementation, where each node 14 is connected to the tow cable 28. The main disadvantage with this scheme is that with each telemetry node 14 attached to the shared bus, the design must be robust enough to overcome the parasitic effects of each of the nodes 14. With all of the nodes 14 essentially in a parallel configuration, a larger parasitic capacitance is seen by the node 14 trying to communicate. This limits high frequency communications as the signal 26 could become quite degraded at high frequencies.

Figure 3:
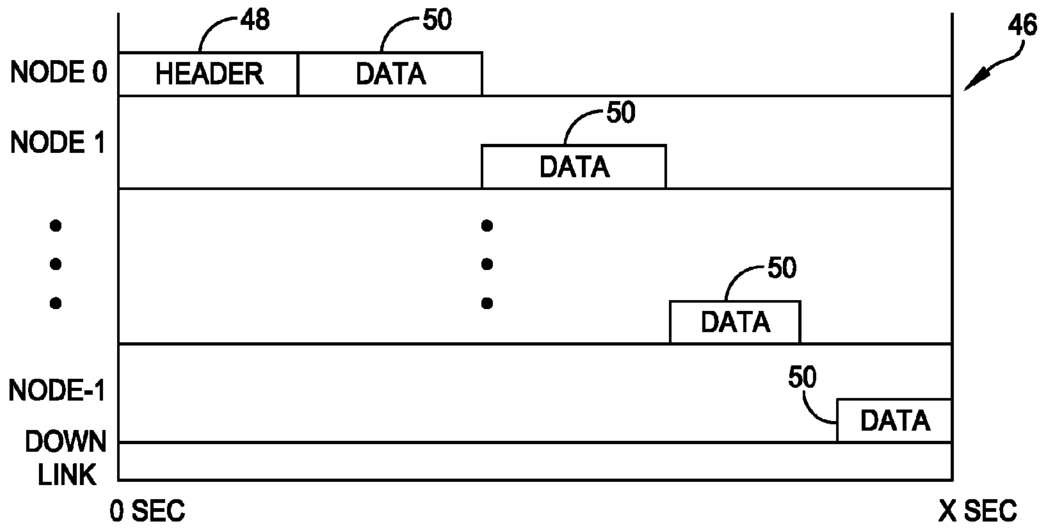
FIG. 3 illustrates one data frame in the bi-directional data flow half-duplex scheme use for the uplink and downlink.

In the bi-directional data flow half-duplex scheme of the present invention, a certain amount of time must be reserved for uplink (acoustic data sent up to the ship from the nodes) and a certain amount of time must be reserved for downlink (data sent down to the nodes, such as gain commands). Furthermore, each node will be assigned a certain amount of time for it to transmit up the tow cable. A diagram illustrating one data frame 46 can be found in FIG. 3. The header 48 allows the receiver to make sense of the incoming data fairly easily by understanding what the header is saying about the data 50. The header bits contain the following: A sync word, 16 bits in length. The sync word will be a pre-determined constant value that can be compared at the ship or underwater vehicle 16 to the incoming data stream. Checking for this sync word tells the receiver where each frame of data begins; A frame counter, 16 bits in length. The frame counter will start at value 0x0000, and increment by one with each frame. The frame counter will serve as a reference point for missing frames of data; A cyclic redundancy check (CRC), 16 bits in length. The CRC provides a means to ensure that none of the data bits were accidentally inverted or corrupted; Finally, a status byte of 8 bits is utilized to transmit a "status code" that can be deciphered at the ship or underwater vehicle 16 to determine the status of telemetry system 10.

The amount of time associated with each frame of data will be equal to the reciprocal of the candidate towed array 12 sampling rate. For case 1, this amount of time is 1 millisecond (ms), and for case 2, the amount of time would be 4 ms. In case 1, each of the 20 nodes has two channels at 16 bits per channel. Therefore, each node 14 will need enough time to transmit 32 bits plus one start bit and one stop bit, totaling 34 bits per node. Each node 14 will need to transmit up the tow cable 28; five bits worth of time (known as the guard band) are allowed for this transmission. Sixteen bits are reserved for a downlink transmission to the nodes and a total of 56 bits are allocated for the header. Summing these bit allocations yield 852 bits that would need to be received/sent by the system in 1 ms. Dividing this number of bits by this amount of time yields 852 kbps or 852 kHz.

In case 2, each of the 250 nodes has two channels at 12 bits per channel. Therefore, each node 14 will need enough time to transmit 24 bits plus one start bit and one stop bit, totaling 26 bits per node. Each node 14 will need to transmit up the tow cable 28; five bits worth of time (known as the guard band) are allowed for this transmission. Sixteen bits are reserved for a downlink transmission to the nodes 14 and a total of 56 bits are allocated for the header. Summing these bit allocations yield 7822 bits that would need to be received/sent by the system in 4 ms. Dividing this number of bits by this amount of time yields 1.9555 Mbps or 1.9555 MHz.

The advantages of the present invention are power and data signals are now shared on a single wire (with a second wire as return) throughout the entire towed underwater acoustic sonar array system. Bidirectional data flow is accomplished by means of a time sharing communication protocol, which incorporates a header 48 that will enable the user to easily determine several factors regarding the incoming data, such as the status of the telemetry system 10 and the ability to recognize if any frames of data 46 have been lost.

In light of the above, it is therefore understood that within the scope of the appended claims, the invention may be practiced otherwise than as specifically described.

What is claimed is:

1. A telemetry system for use with a towed underwater acoustic sonar array of at least two nodes comprising:

a power and data encoder electrically connected to the towed underwater acoustic sonar array that can transmit a combined direct current and data signal from on board a vessel that is towing the array of at least two nodes wherein the array of at least two nodes are arranged in a shared bus architecture, wherein each individual node is connected to a tow cable;

a first wire conductor contained within the tow cable that electrically connects the power and data encoder to each of the at least two nodes in the array and receives the combined direct current and data signal from the power and data encoder;

a second wire conductor contained within the tow cable that electrically connects the power and data encoder to each of the at least two nodes in the array and serves as the ground for the entire system;

a plurality of low-pass filtering power de-couplers, one for each at least two node, that filter out the direct current from the combined direct current and data signal in order to electrically power the at least two nodes;

a plurality of high-pass filtering data decoders, one for each node, that recovers the data signal from the combined direct current and data signal;

a plurality of analog front ends, one for each node, wherein each analog front end is electrically connected to an acoustic sensor that provides an acoustic data sample;

a plurality of telemetry logic units, one for each node, that processes the recovered data signal from the plurality of high-pass filtering data decoders and processes the acoustic data sample from the plurality of analog front ends;

a plurality of data encoders, one for each node, that encode the processed acoustic data sample on to the first wire conductor for transmission back to the vessel that is towing the array of at least two nodes;

a bi-directional time sharing communication protocol that controls signal transmissions across the first wire conductor between the at least two nodes and the vessel that is towing the array of at least two nodes, wherein the bi-directional time sharing communication protocol employs a header comprising:

a sync word, 16 bits in length, that is a pre-determined constant value that can be compared to the incoming data stream to determine where each frame of data begins;

a frame counter, 16 bits in length that will start at a value 0x0000, and increment by one with each frame to serve as a reference point for missing frames of data;

a cyclic redundancy check (CRC), 16 bits in length to ensure that none of the data bits are accidentally inverted or corrupted; and a status byte of 8 bits to transmit a status code to determine the status of telemetry system.

2. The system of claim 1 wherein data is encoded onto the first wire conductor by the power and data encoder during an allotted time frame according to the bi-directional time sharing communication protocol and wherein power is constantly fed onto the first wire conductor independent of data transmission.

3. The system of claim 1 wherein the system has twenty nodes and further comprises:

a total of forty channels, with two channels per node;

a 1 kHz sample rate; and a sixteen bit sampling size.

4. The system of claim 1 wherein the system has two hundred and fifty nodes and further comprises:

a total of five hundred channels, with two channels per node;

a 250 Hz sample rate; and a twelve bit sampling size.

5. The system of claim 1 wherein the amount of time associated with each frame of data will be equal to the reciprocal of a sampling rate for the towed array.

* * * * *